Jan. 22, 1935.   E. DONN   1,988,545
COCK FOR COFFEE MAKING MACHINES
Filed Nov. 24, 1933
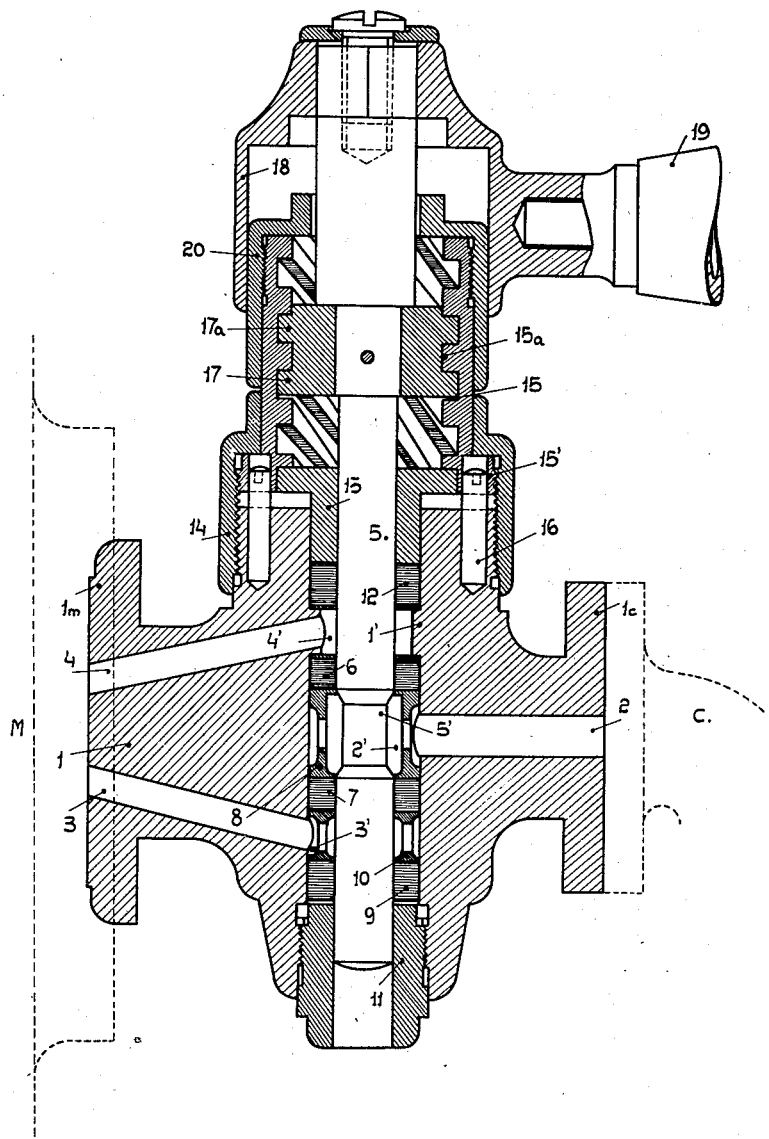

Patented Jan. 22, 1935

1,988,545

UNITED STATES PATENT OFFICE 1,988,545

COCK FOR COFFEE MAKING MACHINES

Ettore Donn, Turin, Italy, assignor to La Victoria Arduino, Turin, Italy

Application November 24, 1933, Serial No. 699,627
In Italy March 30, 1933

4 Claims. (Cl. 251—76)

This invention has for its object a multiple way cock, which comprises an axially movable cylindrical distributing member and is more particularly adapted for machines for the preparation of express coffee, in which the steam supply can be exchanged for the hot water supply and vice versa and the delivery controlled by a simple and quick operation.

The cock according to this invention can be easily assembled and dismounted thus allowing of a quick removal and fitting of the packing rings. The cock plug is conveniently operated by means of a screw and nut device, one element of which—say the nut—is fixed to the body of the cock, while the other element—say the screw—is carried by the plug and is capable of rotating therewith. If the pitch of the screw thread is very large, a slight rotation of the screw will effect a considerable axial displacement of the plug thus establishing the desired communication by a quick operation.

The annexed drawing shows in axial section a cock constructed according to this invention and to be used in connection with machines for the preparation of express coffee.

The body 1 of the cock is fixed on one side to the machine M by means of a flange 1m and is provided at its opposite side with a flange 1c supporting the generating unit C. In a cylindrical chamber along the axis of the body 1 opens a conduit 2 leading to the central part 2' of said chamber, a hot water conduit 3 opens at the lower part 3' and a steam conduit 4 ends at the upper part 4' of said chamber.

A plug in the form of a cylindrical rod 5 is arranged in the axial chamber leaving a large clearance between it and the body 1 and has a section 5' of smaller diameter at the central part of the chamber.

The sections 2', 3', 4' form three annular chambers separated from one another by packing rings 6 and 7 between which a perforated spacing sleeve 8 is arranged. A third lower packing ring 9 limits the lower chamber 3' towards the exterior, a perforated spacing sleeve 10 being interposed between the packing rings 7 and 9. The packing rings 6, 7, 9, are pressed towards a shoulder 1' provided on the wall of the section 4' by a plug 11 through which the rod 5 passes. The upper end of the section 4' is provided with a packing ring 12 pressed against the shoulder 1' by a gland 13 which is forced against said ring by a sleeve 14 screwed to the body 1 with the interposition of a shoulder 15' of the part 15. A nut 15a is formed in the part 15, this latter being prevented from rotating by pins 16.

A screw 17a is formed in the part 17 secured by means of a pin to the rod 5, to which is rigidly fixed a cap 18 provided with a handle 19. The movement of the cap 18 is guided by a collar 20 screwed to the part 15.

The working of the cock will be readily understood. The length of the reduced section 5' of the rod 5 is such that, when the rod is axially displaced it may extend partly into the section 2' and partly into the hot water section 3' or steam section 4', thus placing the conduit 2 in communication with the conduit 3 or 4.

The rod is displaced by rotating the handle 19; the pitch of the screw and nut thread being very large, a slight rotation will be sufficient to exchange the communication 2—3 for the communication 2—4.

The arrangement as shown permits of removing and fitting the packing rings very readily. When one of the three lower packing rings 6, 7, 9 is to be replaced, it will be sufficient to unscrew the plug 11 and remove the rings and spacing sleeves; when it is desired to take off the upper packing ring, it will be necessary to unscrew also the sleeve 14 and remove the rod (without detaching it from the nut) and the gland 13. The pressure on the lower packing rings is adjusted by acting on the plug 11, the pressure on the upper one by acting on the sleeve 14; the angular position of the handle 19 will not be altered during adjustment owing to the presence of the pin 16 between the nut 15 and the body 1 of the cock.

The details of constructions of the cock may be varied from those described and illustrated by way of example without departing from the spirit of the invention.

The cock body may comprise more than three ways and the rod may be provided with a plurality of sections of reduced diameter, so that various communications may be established simultaneously between the different ways of the cock.

What I claim is:

1. Multiple way cock comprising a body having a cylindrical axial chamber and inlet conduits and an outlet conduit, a rod coaxially arranged in said chamber and having a portion of reduced diameter, packing rings fitted in the annular space between said body and said rod and subdividing said annular space in a plurality of sections, some of which sections are in communication with the inlet conduits and a section in communication with the outlet conduit formed in said body, an annular shoulder in one of said sections abutting the adjacent packing rings, spacing sleeves in the other sections for the other packing rings, means at the ends of said body for clamping said packing rings and spacing sleeves against said shoulder and means for producing an axial displacement of said rod so that the portion of reduced diameter of said rod will project partly into one or the other of the sections in communication with the inlet conduits and partly into the section in communication with the outlet conduit for establishing communication between them.

2. Multiple way cock comprising a body having a cylindrical axial chamber and inlet conduits and an outlet conduit, a rod coaxially arranged in said chamber and having a portion of reduced diameter, packing rings fitted in the annular space between said body and said rod and subdividing said annular space in a plurality of sections, some of which sections are in communication with the inlet conduits and a section in communication with the outlet conduit formed in said body, a screw and nut mechanism, one element of which is fixed to said body and the other to said rod and means for rotating said rod thus producing an axial displacement of said rod so that its portion of reduced diameter will project partly into one or the other of the sections in communication with the inlet conduits and partly into the section in communication with the outlet conduit for establishing communication between them.

3. Multiple way cock comprising a body having a cylindrical axial chamber and inlet conduits and an outlet conduit, a rod coaxially arranged in said chamber and having a portion of reduced diameter, packing rings fitted in the annular space between said body and the rod and subdividing said annular space in a plurality of sections, some of which sections are in communication with the inlet conduits and a section in communication with the outlet conduit formed in said body, an annular shoulder in one of said sections abutting the adjacent packing rings, spacing sleeves in the other sections for the other packing rings, means at the ends of said body for clamping said packing rings and spacing sleeves against said shoulder, a screw and nut mechanism, one element of which is fixed to said body and the other to said rod and means for rotating said rod thus producing its axial displacement so that its portion of reduced diameter will project partly into one or the other of the sections in communication with the inlet conduits and partly into the section in communication with the outlet conduit for establishing communication between them.

4. Three way cock comprising a body having a cylindrical axial chamber, a rod coaxially arranged in said chamber and having a central portion of reduced diameter, packing rings in the annular space between said body and rod thus arranged as to subdivide said space into three sections, the central one being in communication with an outlet conduit and the upper and lower ones with independent inlet conduits formed in said body, an annular shoulder in the upper section abutting the adjacent packing rings, spacing sleeves in the other sections for said packing rings, a plug screwed to the lower end of said body and clamping the central and lower packing rings and the spacing sleeves on said shoulder, a gland for clamping the upper packing ring on said shoulder, a nut having a large pitch thread fixed to said body above the gland, a threaded member engaging said nut and fixed to the rod and a handle for rotating and displacing axially said rod, so that the portion of reduced diameter of said rod will project to such extent that the central section will be placed in communication with the upper or lower section as desired.

ETTORE DONN.